United States Patent [19]
Hashimoto

[11] Patent Number: 4,945,373
[45] Date of Patent: Jul. 31, 1990

[54] DISPLAY SYSTEM FOR CAMERA
[75] Inventor: Takeshi Hashimoto, Osaka, Japan
[73] Assignee: Minolta Camera Kabushiki Kaisha, Osaka, Japan
[21] Appl. No.: 298,112
[22] Filed: Jan. 18, 1989
[30] Foreign Application Priority Data
  Jan. 19, 1988 [JP] Japan .................. 63-4195[U]
[51] Int. Cl.$^5$ ............... G03B 17/18; G03B 17/36
[52] U.S. Cl. ................. 354/217; 354/289.12; 354/195.13
[58] Field of Search .......... 354/217, 195.13, 289.1, 354/289.11, 289.12, 471, 472, 474, 475; 352/171
[56] References Cited

U.S. PATENT DOCUMENTS

| | | | |
|---|---|---|---|
| 4,114,995 | 9/1978 | Stieringer et al. | 352/171 |
| 4,298,257 | 11/1981 | Togo et al. | 354/475 |
| 4,397,534 | 8/1983 | Sakurada et al. | |
| 4,461,560 | 7/1984 | Yashino et al. | 354/475 |
| 4,540,262 | 9/1985 | Nakai et al. | 354/195.13 |
| 4,582,413 | 4/1986 | Suzuki et al. | 354/475 |
| 4,621,914 | 11/1986 | Taniguchi et al. | 354/475 X |

FOREIGN PATENT DOCUMENTS 61-53625  3/1986  Japan.
61-109036  5/1986  Japan.

OTHER PUBLICATIONS
"Technical Profile of α-700".

Primary Examiner—W. B. Perkey
Attorney, Agent, or Firm—Burns, Doane, Swecker & Mathis

[57] ABSTRACT

A display system for a camera which can make a display of a focal length of the camera on an existing display device for display of a photographing frame count of a film without provision of an additional display device and without increasing the number of display segments of the existing display device. The display system comprises a display means, a first display control means for controlling the display means to display a frame count of a film, a taking lens having a variable focal length, a detecting means for detecting a focal length of the taking lens, a second display control means for controlling the display means to display the focal length of the taking lens detected by the detecting means, and a changing means for alternatively rendering the first or second display control means effective. The display means thus normally displays a current frame count of a film in the camera but displays a current focal length of the taking lens, for example, when the focal length of the taking lens is being varied.

8 Claims, 11 Drawing Sheets

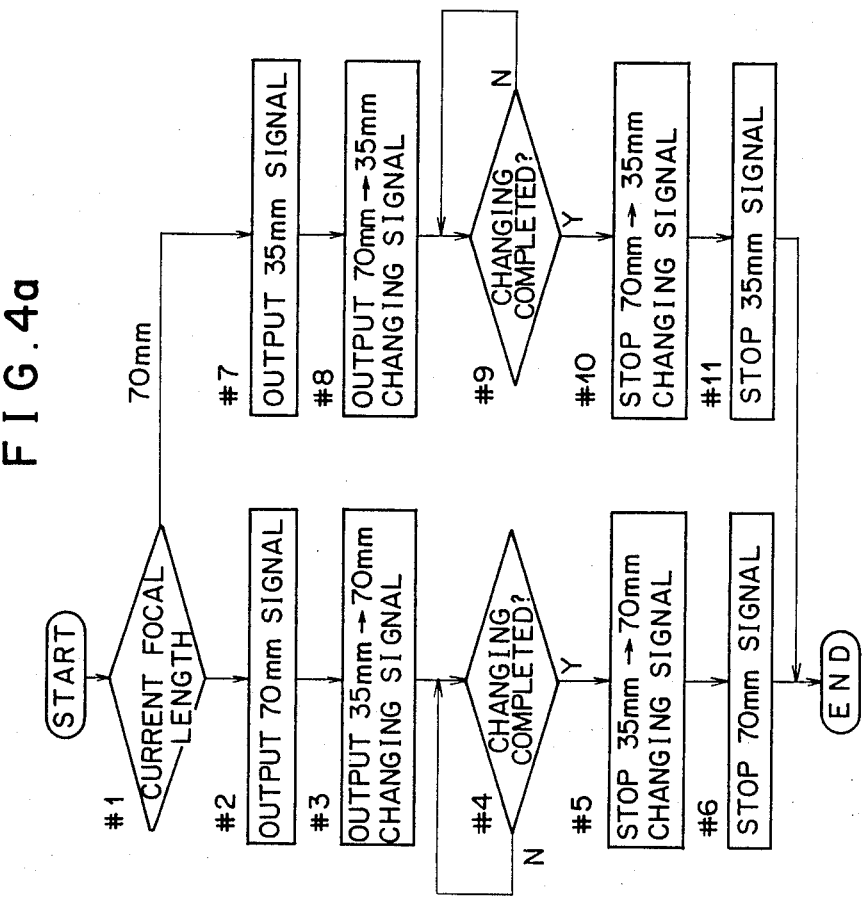

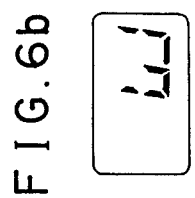
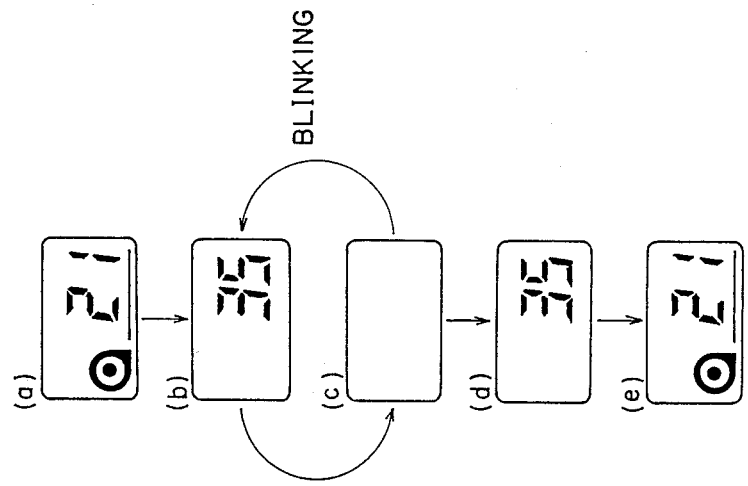
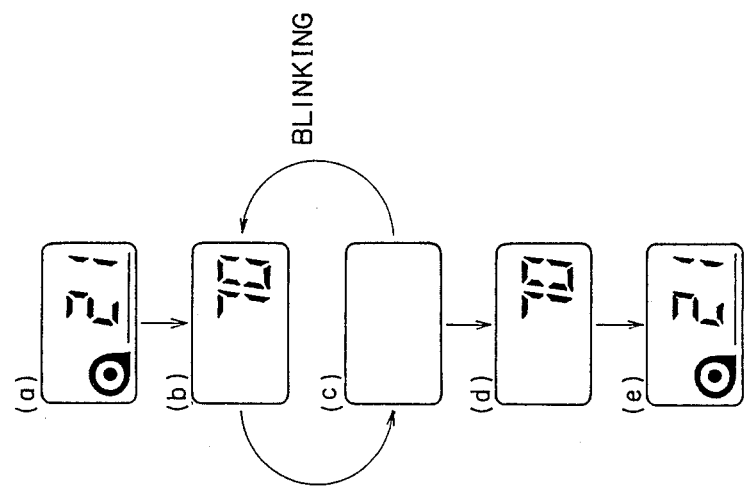

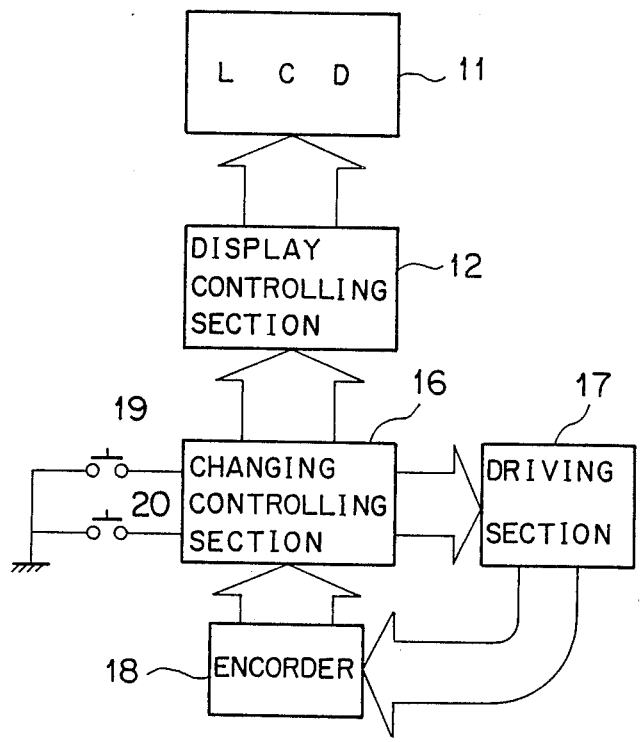

DISPLAY SYSTEM FOR CAMERA

BACKGROUND OF THE INVENTION

1. Field of the Invention

This invention relates to a display system for a camera, and more particularly to a technique of making a display of a focal distance of a photographing lens making use of a display device existing on a camera.

2. Description of the Prior Art

In recent years, display devices which adopt a liquid crystal element or the like are employed for a display system for a camera. Such a display device provides a readily observable display of a large area comparing with conventional display devices.

Meanwhile, where a camera has a multi-focal length lens with which the focal length can be changed for wide angle photographing, tele-photographing and so on or has an electrically driven zoom lens, it is necessary to display a focal length of the photographing lens. To this end, conventionally a display device for display of a focal length is provided additionally, or else an existing display device is provided with an increased number of display segments.

However, provision of an additional display device is not preferable because of a limited spacing for display of a camera, and also increase in number of display segments is difficult due to accompanying increase in number of terminals of and for the display device.

SUMMARY OF THE INVENTION

It is an object of the present invention to provide a display system for a camera which can make a display of a focal length of the camera on an existing display device for display of a photographing frame count of a film without provision of an additional display device and without increasing the number of display segments of the existing display device.

In order to attain this object, according to one aspect of the present invention, there is provided a display system for a camera comprises a display means for displaying at least two figures thereon, a first display control means for controlling the display means to display a frame count of a film, a taking lens having a variable focal length, a detecting means for detecting a focal length of the taking lens, a second display control means for controlling the display means to display the focal length of the taking lens detected by the detecting means, and a changing means for alternatively rendering the first display control means or the second display control means effective.

With the display system, the display means normally displays a current frame count of a film in the camera but displays a current focal length of the taking lens when required, for example, when the focal length of the taking lens is being varied. Accordingly, a focal length of the taking lens can be displayed on the same single display means for display of a frame count without increasing the number of display segments.

According to another aspect of the present invention, there is provided a display system for a camera which comprises a taking lens having a variable focal length, an operating means, a lens driving means for driving the taking lens to vary a focal length of the taking lens in response to operation of the operating means, a first detecting means for detecting a focal length of the taking lens, a display means for displaying a focal length thereon, a second detecting means for detecting whether or not the operating means is operated, and a display control means for controlling the display means to display the focal length of the taking lens detected by the first detecting means when the second detecting means detects that the operating means is in operation.

Also with the display system, similar effects can be attained. Particularly, a current focal length of the taking lens is displayed only while the operating means is in operation, for example, for zooming operation of the camera.

According to a further aspect of the present invention, there is provided a display system for a camera which comprises a display means for displaying information for at least first and second modes of the camera thereon, a display control means for controlling the display means to display information for an alternative one of the first and second modes, a display state control means for controlling the display means to display information for the second mode in an alternative one of two display states, an operating member; and a timer means for counting a predetermined period of time in response to stopping of operation of the operating means to output a signal for the predetermined period of time, wherein the display control means controls the display means to display information for the first mode when the operating means is not operated and to display information for the second mode in response to operation of the operating member, and the display state control means controls the display means to display information for the second mode in a first display state during operation of the operating member and then in a second display state in response to the output signal of the timer means, whereafter the display control means controls the display means to display information for the first mode.

Also with the display system, similar effects can be attained. Further with the display system, information for the first mode of the camera such as a frame count of a film is normally indicated on the display means, but when the operating member is operated, for example, for zooming operation, information for the second mode such as a focal length of the taking lens is displayed on the display means. While the operating member is being operated, the information for the second mode is displayed in the first display state, for example, in a blinking display state, but after the operation of the operating member is stopped, the information for the second mode is displayed in the second display state, for example, in a continuous display state for the predetermined period of time. After lapse of the predetermined period of time, display of the information for the first mode is restored.

The above and other objects, features and advantages of the present invention will become apparent from the following description and the appended claims, taken in conjunction with the accompanying drawings.

BRIEF DESCRIPTION OF THE DRAWINGS

FIGS. 4a and 4b are flow charts illustrating operations of a changing controlling means and a display changing means, respectively, of the display system of FIG. 3;

FIGS. 5a and 5b are front elevational views of the display device of FIG. 2 illustrating display patterns at difference stages of display when the focal length is to be changed to 70 m/m and 35 m/m, respectively;

FIGS. 6a, 6b and 6c are front elevational views of the display device of FIG. 2 showing alternative display patterns;

FIG. 8 is a block diagram illustrating general construction of the display system of the camera of FIGS. 7a and 7b;

DETAILED DESCRIPTION OF THE PREFERRED EMBODIMENT

Figure 1A:
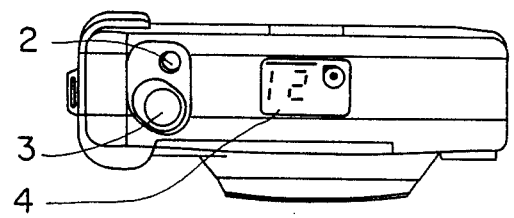
FIGS. 1a and 1b are a top plan view and a front elevational view, respectively, of a camera in which a display system according to the present invention is incorporated.
Figure 1B:
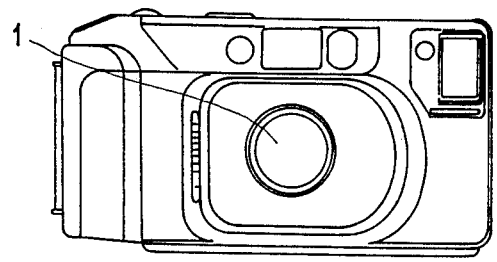

Referring first to FIGS. 1a and 1b, there is shown an appearance of a camera in which a display system according to the present invention is incorporated. The camera shown includes a photographing or taking lens 1 having a focal length which can be changed over between 35 m/m and 70 m/m. Each time a changing instructing button 2 is depressed, the photographing lens 1 is driven by a motor not shown to change over its focal length from 35 m/m to 70 m/m or vice versa. The camera further includes a shutter release button 3, and a liquid crystal display (hereinafter referred to as "LCD") panel 4 serving as a display device which normally displays a photographing frame count of a film thereon.

Figure 2:
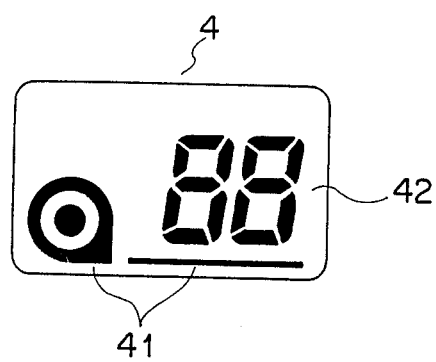
FIG. 2 is a front elevational view showing an arrangement of display segments of a display device of the camera of FIGS. 1a and 1b.

Referring now to FIG. 2, the LCD panel 4 has an arrangement of display segments which consists of a film monitoring section 41 for displaying film mounting information and film feeding information thereon and a film counter section 42 for displaying a photographing frame count of a film thereon. The display pattern of the LCD panel 4, for example, shown in FIG. 1a represents that a film is loaded correctly in the camera and the camera is prepared for photographing at the 21st frame of the film.

Figure 3:
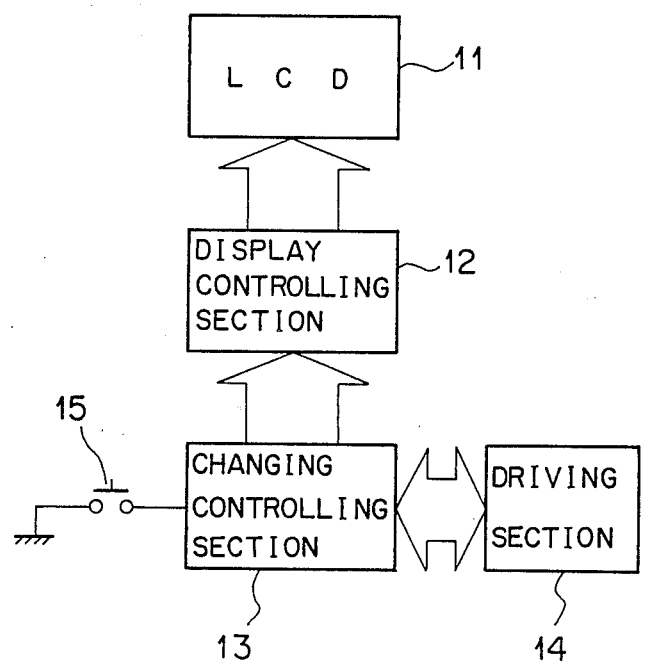
FIG. 3 is a block diagram illustrating general construction of the display system of the camera of FIGS. 1a and 1b.

Referring to FIG. 3, general construction of the display system of the present invention is shown in block diagram. The display system shown includes a focal length changing switch 15 which is turned on when the changing instructing button 2 shown in FIG. 1a is depressed. The display system further includes a changing controlling section 13 which operates in response to turning on of the focal length changing switch 15 to control a driving section 14 and deliver focal length information to a display controlling section 12. The display system further includes an LCD 11 installed in the LCD panel 4. The display controlling section 12 thus sends focal length information to the LCD 11 and controls the LCD 11 to change over its display from a display of a photographing frame count to a display of a focal length.

Figure 4B:
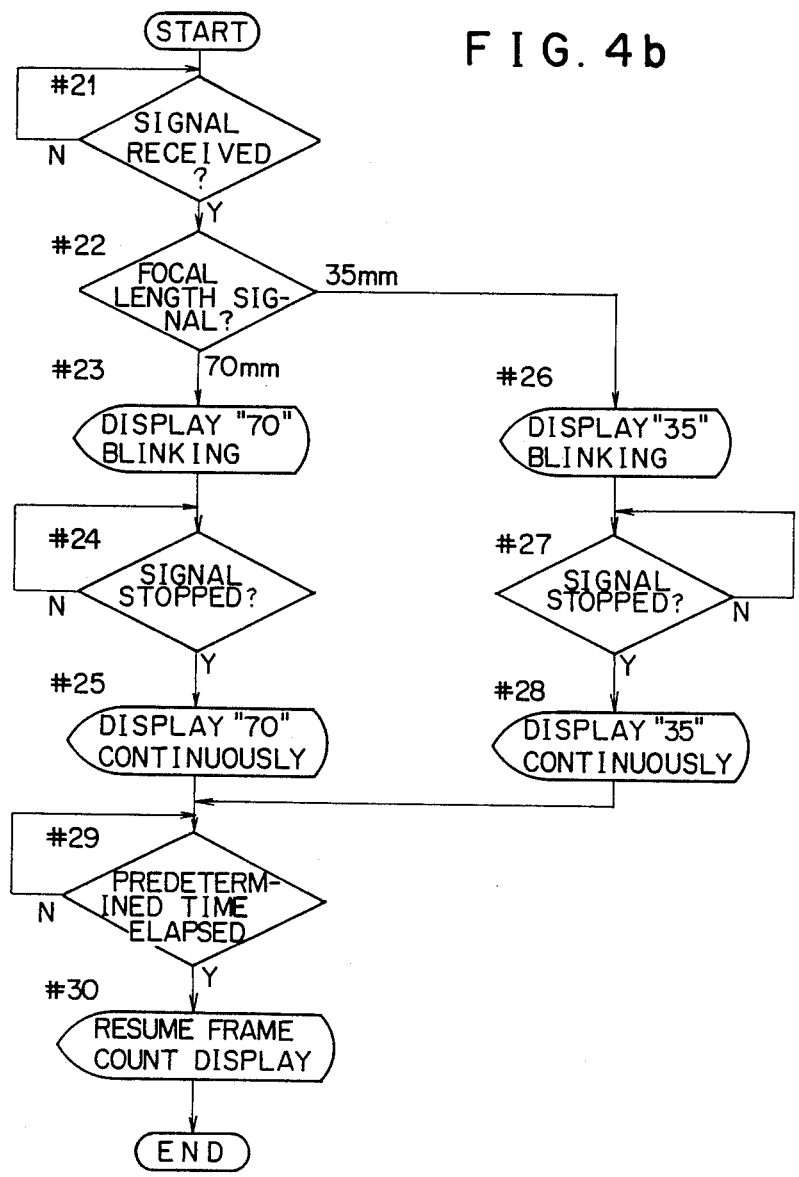

FIGS. 4a and 4b show flow charts of operation of the display system according to the present invention when the focal length of the camera is to be changed from 35 m/m in an initial state of the camera to 70 m/m. It is to be noted that, in the flow charts of FIGS. 4a and 4b, each step number is indicated with a prefix of "#" like #1.

Referring first to FIG. 4a, operation of the changing controlling section 13 for controlling changing of the focal length of the camera is illustrated. When the changing instructing button 2 of the camera is depressed to turn the focal length changing switch 15 on, the changing controlling section 13 discriminates at first at step #1 whether the focal length at present is 35 m/m or 70 m/m. Since the focal length is 35 m/m in the initial state of the camera, the changing controlling section 13 delivers, at step #2, to the display controlling section 12 a signal indicating that an aimed focal length is 70 m/m as focal length information. Then at step #3, the changing controlling section 13 delivers to the driving section 14 a signal instructing that the focal length should be changed from 35 m/m to 70 m/m. In response to the instruction signal, the driving section 14 activates a focal length changing motor not shown to rotate to start changing of the focal length of the taking lens.

Then, after it is discriminated at step #4 that the intended changing of the focal length is completed, the focal length changing controlling section 13 stops, at step #5, the delivery of the changing instruction signal to the focal length changing section 14 to cause the focal length changing motor to be stopped. Finally at step #6, the changing controlling section 13 stops the delivery of the 70 m/m signal to the display controlling section 12, thereby completing the changing operation.

Operation of the changing controlling section 13 when the focal length of the camera is to be changed from 70 m/m to 35 m/m proceeds in a similar manner through steps #1 and #7 to #11.

Referring now to FIG. 4b, operation of the display controlling section 12 is illustrated in flow chart. The display controlling section 12 starts its operation when the focal length changing switch 15 is turned on and waits, at first at step #21, until a distance signal of either 35 m/m or 70 m/m is received from the changing controlling section 13. After reception of a distance signal, the display controlling section 12 discriminates at step #22 whether the distance signal indicates 35 m/m or 70 m/m, and causes, after such discrimination, the LCD 11 to change over its display from a frame count display to a focal length display. In case the focal length is 35 m/m in the initial state of the camera, the distance signal from the focal distance changing controlling section 13 then represents 70 m/m. Accordingly, the LCD 11 changes over its display from such a frame count display at a first stage (a) as seen in FIG. 5a to a focal length display wherein "70" is blinked by way of a second stage (b) at which "70" is displayed and a third stage (c) at which no display is made. Such a blinking display is effected at step #23. Then at step #24, the display controlling section 12 waits until the delivery of the changing instruction signal from the changing controlling section 13 is stopped after completion of the focal length changing operation, and after stopping of reception of the changing instruction signal, the display controlling section 12 controls, at step #25, the LCD 11 to change over its display from the blinking display of "70" to a continuous display of "70". Such a continuous display of "70" is illustrated at a stage (d) in FIG. 5a. A user of the camera is thus informed that the intended changing of the focal length has been completed. Then, after lapse of a predetermined interval of time after starting of such continuous display of "70" is discriminated at step #29, the display controlling section 12 controls, at step #30, the LCD 11 to restore its frame count display at a final stage (e) shown in FIG. 5a.

Operation of the display controlling section 12 when the focal length of the camera is to be changed from 70 m/m to 35 m/m proceeds in a similar manner with the steps from #23 to #25 replaced by alternative steps from #26 to #28, and different stages of display by the LCD 11 during the operation are illustrated in FIG. 5b.

It is to be noted that discrimination of the current focal length of the camera at step #1 may be attained, for example, by a device wherein a contact pattern and a contact brush are provided on one and the other of a pair of members which are moved relative to each other upon changing of the focal length. Alternatively, such discrimination may be made in accordance with an operating direction stored in an electric or electronic storage means upon preceding focal length changing operation. Or else, the position of a member which is moved upon changing of the focal length may be mechanically detected.

While the focal length is displayed in numerical value on the LCD 11 of the display system described above, it may be displayed otherwise in some other characters or marks. For example, it may be displayed in alphabetical character of "T", "W" or "S" of the capital letters of "Tele", "Wide" and "Standard" representing telephotographing, wide angle photographing and standard photographing as seen in FIGS. 6a, 6b and 6c, respectively.

Figure 7A:
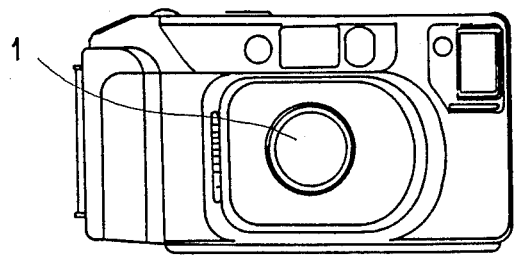
FIGS. 7a and 7b are a front elevational view and a top plan view, respectively, of a camera in which a display system according to another embodiment of the present invention is incorporated.
Figure 7B:
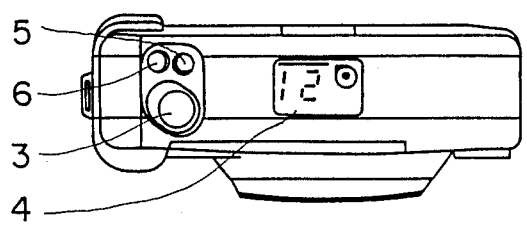

Referring now to FIGS. 7a and 7b, there is shown a camera in which a display system according to a second embodiment of the present invention is incorporated. It is to be noted that like elements are denoted by like reference numerals to those of FIGS. 1a and 1b. The camera shown includes a photographing lens 1 in the form of a zoom lens the focal length of which can vary continuously from 35 m/m to 70 m/m. The camera further includes a shutter release button 3 and an LCD panel 4. The camera additionally includes a pair of zoom buttons 5 and 6 each serving as a focal length changing instructing member, and more particularly, a zoom-in button 5 for delivering an instruction to make a focal length changing operation (such a focal length changing operation will be hereinafter referred to as "zooming operation") from a short focal length to a long focal length, and a zoom-out button 6 for delivering an instruction to make a zooming operation from a long focal length to a short focal length. Here, such a zooming operation is performed by rotation of a motor not shown only for a period of time while the zoom-in button 5 or the zoom-out button 6 is held depressed.

Referring now to FIG. 8, general construction of the display system of the camera of FIGS. 7a and 7b is shown in block diagram. The display system includes a switch 19 which is turned on in response to depression of the zoom-in button 5, and another switch 20 which is turned on in response to depression of the zoom-out button 6. The display system further includes a driving section 17 for driving the photographing lens 1 to perform a zooming operation, and an encoder 18 for converting focal length information from the driving section 17 into a 3-bit binary code. The display system further includes a changing controlling section 16 operable in response to turning on of the zoom-in switch 19 or the zoom-out switch 20 for controlling the driving section 17 and for delivering focal length information read out from the encoder 18 to a display controlling section 12. When the display controlling section 12 receives a signal indicative of a focal length from the changing controlling section 16, it delivers the signal to an LCD 11 serving as a display device and controls the LCD 11 to make a display of the focal length.

Figure 9:
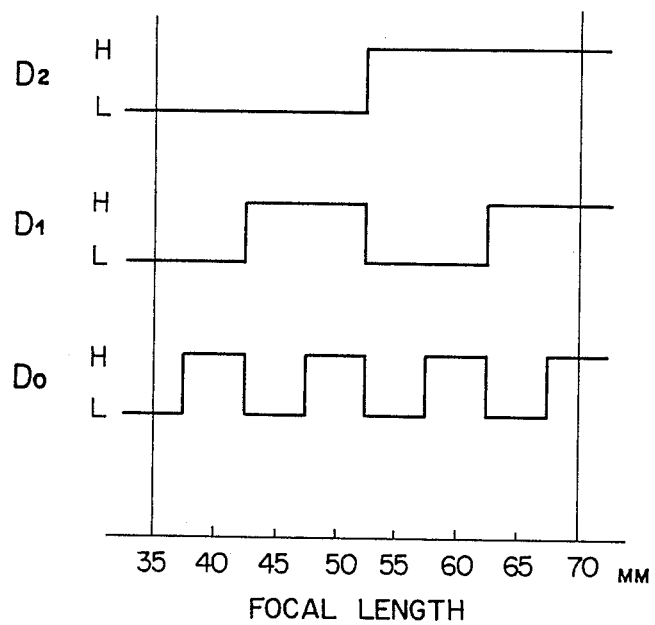
FIG. 9 is a waveform diagram of an encoder illustrating 3-bit binary codes representative of focal lengths.

FIG. 9 illustrates an exemplary set of codes indicative of focal length information, and in FIG. 9, the focal length is displayed at intervals of 5 m/m and a piece of focal length information is represented by a 3-bit binary code. It can be seen from FIG. 9 that, for example, where the focal length is 50 m/m, focal length information ($D_2$, $D_1$, $D_0$) is a binary code of "LHH" (L denotes a low level, and H denotes a high level).

Figure 10A:
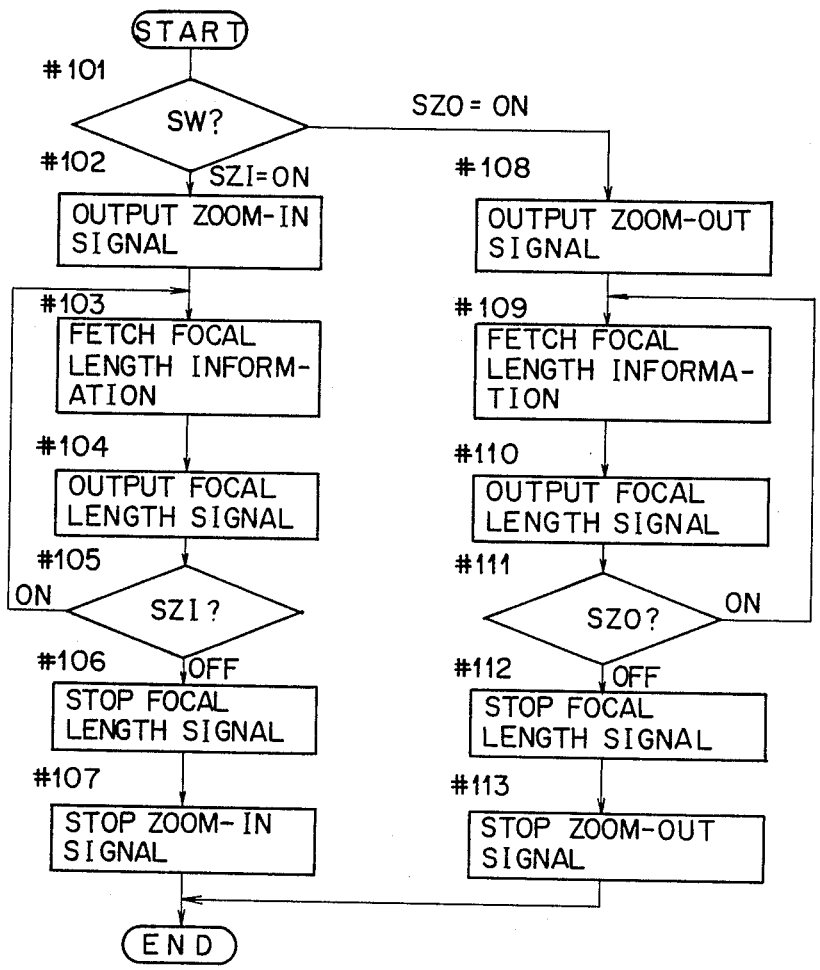
FIGS. 10a and 10b are flow charts illustrating operations of a changing controlling means and a display changing means, respectively, of the display system of FIGS. 8.

FIG. 10a illustrates operation of the changing controlling section 16. It is to be noted that, in the flow chart shown in FIG. 10a, the zoom-in switch 19 and the zoom-out switch 20 are represented by $S_{ZI}$ and $S_{ZO}$, respectively. Referring to FIG. 10a, an exemplary zoom-in operation to change the focal length from 35 m/m to 40 m/m will be described. When the zoom-in button 5 is depressed to turn the zoom-in switch 19 on, the operation illustrated in FIG. 10a is started. The focal length changing controlling section 16 thus checks at first at step #101 whether the zoom-in switch 19 or the zoom-out switch 20 is depressed. Since the zoom-in switch 19 is on in this instance, the focal length changing controlling section 16 delivers, at step #102, a zoom-in instructing signal to the driving section 17 to cause the driving section 17 to drive a zooming motor not shown to rotate to start a zooming operation. Then at step #103, the changing controlling section 16 reads current focal length information from the encoder 18, and then at step #104, the changing controlling section 16 delivers a focal length signal to the display controlling section 12. Since the focal length is 35 m/m in this instance, the distance information is a binary code of "LLL" (refer to FIG. 9). The steps #103 and #104 are repeated until after the zoom-in switch 19 is turned off.

After depression of the zoom-in button 5 is canceled to turn the zoom-in switch 19 off, the focal length changing controlling section 16 stops its delivery of the focal length signal to the display controlling section 12 at step #106 and then stops its delivery of the zoom-in signal to the focal length changing section 17 at step #107 thereby to stop the zooming motor to end the zooming operation.

A zoom-out operation is performed in a similar manner by way of steps #101 and #108 to #113.

Figure 10B:
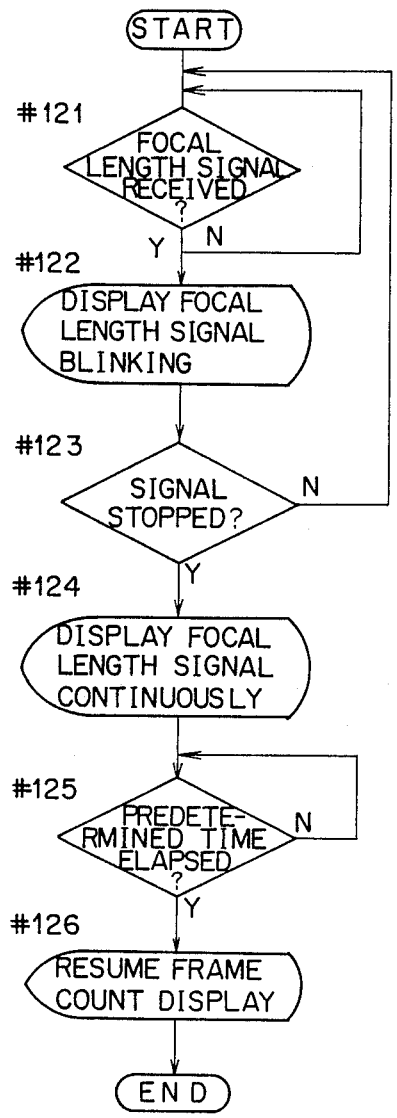
Figure 11:
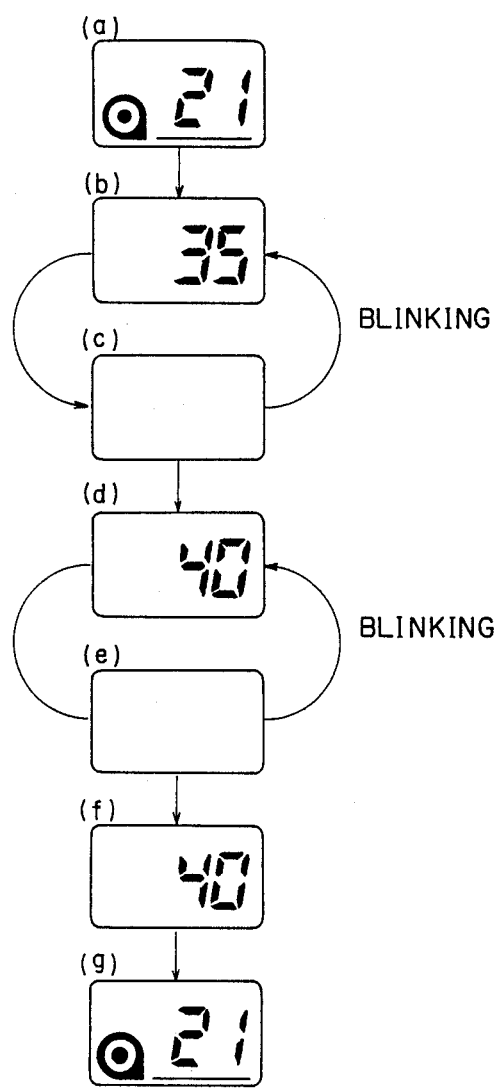
FIG. 11 shows front elevational views of a display device of the display system of FIG. 8 illustrating display patterns at different stages of display when the focal length of a zoom lens is to be changed from 35 m/m to 40 m/m.

FIG. 10b illustrates operation of the display controlling section 12 during zooming. As described above, after the zoom-in switch 19 is turned on, the changing controlling section 16 reads current focal length information from the encoder 18 at step #103 and delivers a focal length signal to the display controlling section 12 at step #104. The display controlling section 12 thus waits, at step #121, until such a focal length signal is received, and after a focal length signal is received, the display controlling section 12 controls the LCD 11 serving as a display device to change over its display from such a frame count display as seen at a first stage (a) in FIG. 11 to such a focal length display as seen at second and third stages (b) and (c) in FIG. 11. The stages (b) and (c) are repeated at step #122 to make a blinking display that the focal length is 35 m/m in an initial state of the camera. The steps #121 and #122 are repeated until it is discriminated at step #123 that the zoom-in switch 19 is turned off, that is, until the delivery of the focal length signal from the changing controlling section 16 is stopped. As the zooming operation proceeds until the focal length of the photographing lens 1 is changed from 35 m/m to 40 m/m, the focal length information from the encoder 18 changes from a binary code of "LLL" to another binary code of "LLH". The change is detected by the changing controlling section 16, and such a changed focal length signal is delivered to the display controlling section 12. In response to the changed focal length signal, the display controlling section 12 controls the LCD 11 to change its display to such a blinking display of 40 m/m as at stages (d) and (e) shown in FIG. 11. Then, if the zoom-in switch 19 is turned off in this condition, then the changing controlling section 16 stops its delivery of the focal length signal to the display controlling section 12 (step #123). In response to stopping of reception of the focal length signal, the display controlling section 12 controls, at step #124, the LCD 11 to change over its display to a continuous display of 40 m/m which is the focal distance upon stopping of reception of the focal length signal as at a stage (f) shown in FIG. 11. The continuous display is maintained for a predetermined period of time at step #125, and after then, the display controlling section 12 controls, at step #126, the LCD 11 to restore its original frame count display as at a stage (g) shown in FIG. 11, thereby completing the display changing operation.

Also in a zoom-out operation, a display changing operation is performed through the same steps #121 to #126.

Figure 12A:
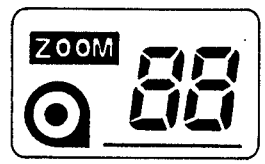
FIGS. 12a and 12b are front elevational views of modified display devices having increased numbers of display segments.
Figure 12B:
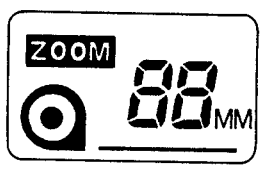
Figure 13:
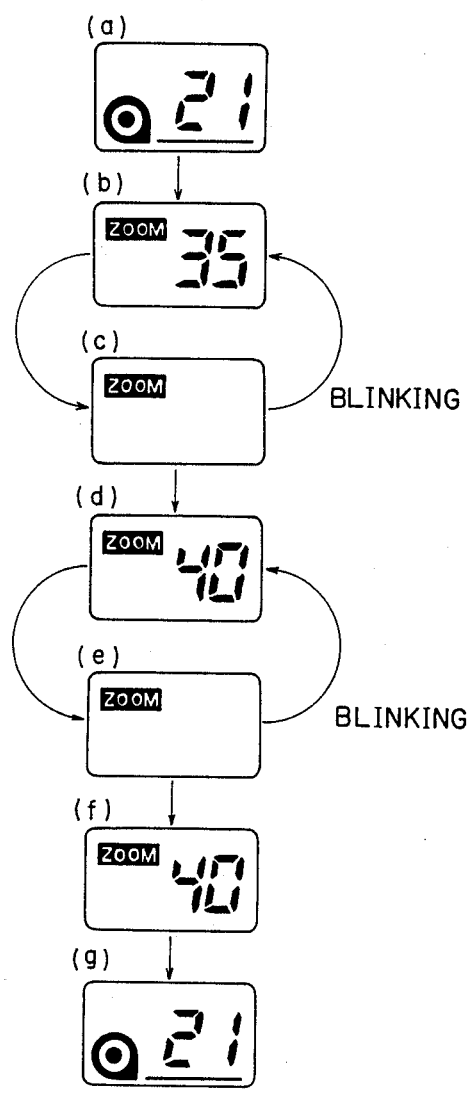
FIGS. 13 and 14 are front elevational views of the display devices of FIGS. 12a and 12b, respectively, illustrating display patterns at different stages of display in use.
Figure 14:
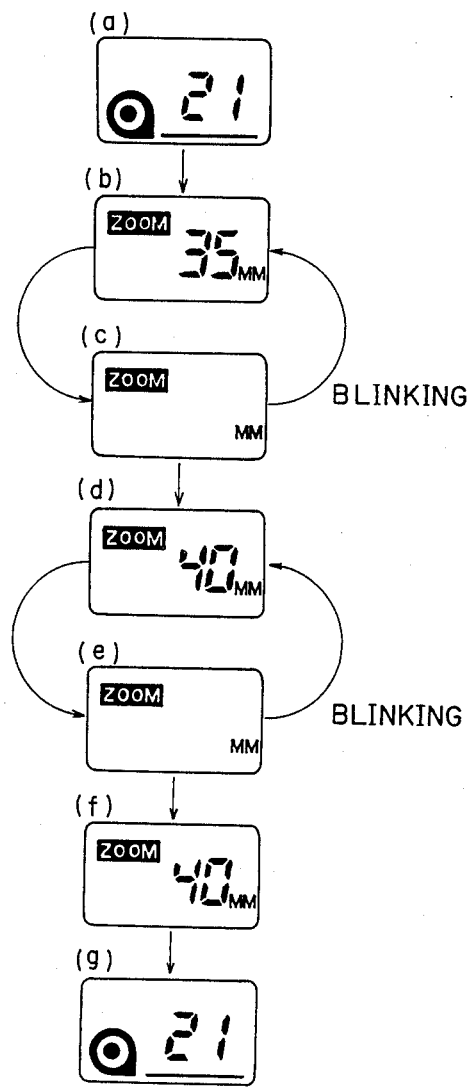

FIGS. 12a and 12b show different exemplary modified arrangements of display segments of the LCD 11. In the case of such a zoom lens as described above, display patterns for focal lengths are increased in number comparing with those of a lens in which the focal length thereof is changed over in two or three steps and are thus complicated a little in construction, which increases the probability that a user of the camera may make an error in observation of a display of the display system. In order to prevent such an error, a display segment or segments for making a display of "ZOOM" may additionally be provided in the LCD 11 as seen in FIG. 12a so that a display of "ZOOM" may be given during display of a focal length as shown in FIG. 13. Or else, display segments for making displays of "ZOOM" and "mm" may additionally be provided as shown in FIG. 12b so that displays of "ZOOM" and "mm" may be given during display of a focal length as shown in FIG. 14. In any case, additional provision of only one or two display segments in an existing display device is required, which is far advantageous comparing with provision of an additional display device for making a focal length display.

Having now fully described the invention, it will be apparent to one of ordinary skill in the art that many changes and modifications can be made thereto without departing from the spirit and scope of the invention as set forth herein.

What is claimed is:

1. A display system for a camera, comprising:
    a display means for displaying at least two figures thereon;
    a first display control means for controlling said display means to display a frame count of a film;
    a taking lens having a variable focal length;
    a detecting means for detecting a focal length of said taking lens;
    a second display control means for controlling said display means to display the focal length of said taking lens detected by said detecting means;
    a changing means for alternatively rendering said first display control means or said second display control means effective;
    an operating means;
    a lens driving means for driving said taking lens to vary a focal length of said taking lens in response to operation of said operating means, wherein said changing means renders said second display control means effective in place of said first display control means in response to operation of said operating means; and
    a timer means for counting a predetermined period of time in response to stopping of said operation of said operating means to output a signal for the predetermined period of time, wherein said changing means renders said second display control means effective in place of said first display control means in response to the signal of said timer means.

2. A display system as claimed in claim 1, wherein said changing means renders said first display control means effective in place of said second display control means in response to a second operation of said operating means.

3. A display system as claimed in claim 1, wherein said second display control means controls said display means to display the focal length in a first display state during operation of said operating means and in a second display state different from the first state after stopping of operation of said operating means.

4. A display system as claimed in claim 3, wherein said second display control means controls said display means to turn its display repetitively on and off in the first display state and keep its display on in the second display state.

5. A display system for a camera, comprising:
    a taking lens having a variable focal length;
    an operating means;
    a lens driving means for driving said taking lens to vary a focal length of said taking lens in response to operation of said operating means;
    a first detecting means for detecting a focal length of said taking lens;
    a display means for displaying a focal length thereon;
    a second detecting means for detecting whether or not said operating means is operated;
    a display control means for controlling said display means to display the focal length of said taking lens detected by said first detecting means when said second detecting means detects that said operating means is in operation; and a timer means for counting a predetermined period of time in response to stopping of said operation of said operating means to output a signal for the predetermined period of time, wherein said display control means controls said display means to display the focal length in response to the output signal of said timer means.

6. A display system for a camera, comprising:

a display means for displaying information for at least first and second modes of said camera thereon;

a display control means for controlling said display means to display information for an alternative one of the first and second modes;

a display state control means for controlling said display means to display information for the second mode in an alternative one of two display states;

an operating member; and a timer means for counting a predetermined period of time in response to stopping of operation of said operating means to output a signal for the predetermined period of time;

wherein said display control means controls said display means to display information for the first mode when said operating means is not operated and to display information for the second mode in response to operation of said operating member, and said display state control means controls said display means to display information for the second mode in a first display state during operation of said operating member and then in a second display state in response to the output signal of said timer means, whereafter said display control means controls said display means to display information for the first mode.

7. A display system for a camera, comprising:

a taking lens having a variable focal length;

an operating member;

a lens driving means for driving said taking lens to vary a focal length of said taking lens in response to operation of said operating member;

a detecting means for detecting whether said focal length of said taking lens is being varied;

a display means for displaying at least two figures thereon; and a display control means for controlling said display means to display a focal length of said taking lens and to display information other than the focal length at a same portion of said display in place of said focal length, wherein said display control means controls said display means to maintain the display of the focal length while said detecting means detects that said focal length of said taking lens is being varied irrespective of an operating condition of said operating member.

8. A display device for a camera, comprising:

a taking lens having a variable focal length;

an operating member;

a lens driving means for driving said taking lens to vary a focal length of said taking lens in response to operation of said operating member;

a display means for displaying a focal length of said taking lens;

a determining means for determining a focal length aimed to be set; and a display control means for controlling said display means to display the aimed focal length determined by said determining means in response to an operation of said operating member.

* * * * *